9386X
E. P. Fitz Patrick.
Constructing Boats.
Patented Feb. 12, 1836.
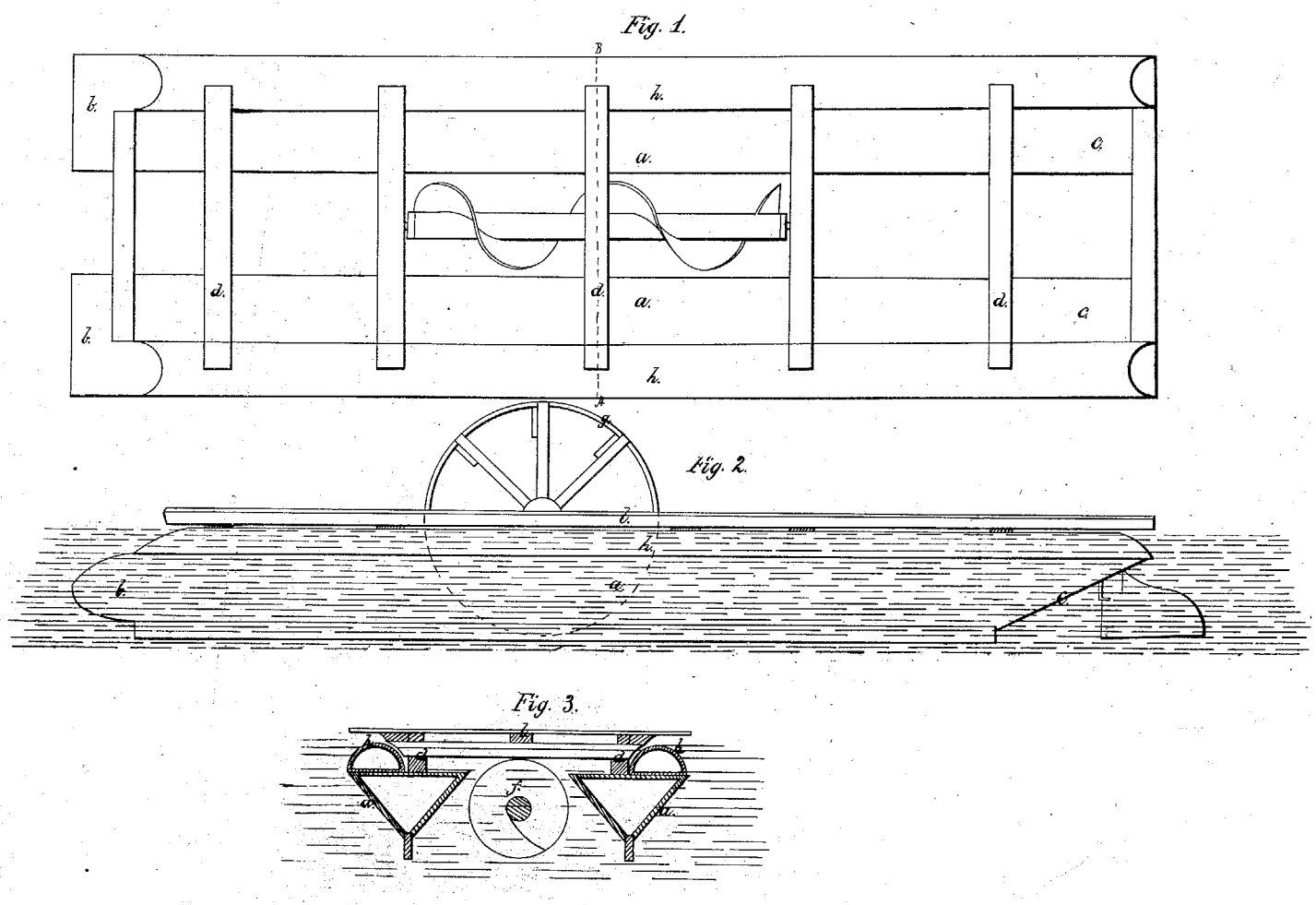

9386X Feb, 12, 1836

Edward P Fitz Patrick of Mount Morris New York

Letters Patent.

The Schedule referred to in these Letters Patent and making part of the same containing a description in the words of the said Edward P. Fitz Patrick himself of his improvement in the construction of Boats.

To all to whom these presents shall come. Be it known that I Edward P. Fitz Patrick of Mount Morris in the County of Livingston and State of New York. have invented a new and useful improvement in the manner of constructing boats to be used under water with the bottom of the Vessel or platform on which the burthen lies to be sustained (as it consists of the freight) by means of pillars rising from each of these two twin boats. by which arrangement I purpose to remedy the inconvenience arising from the agitation of the water at its surface. which tends so materially to injure the sides of the embankments of canals. The operation and construction of these twin boats is thus contrived. Each side from the keel to the deck (as it may be termed) is to be straight instead of curved as is usual. and thereby will form with the said deck, the three sides of a triangle which may be extended to any desired length. the size or capacity is uniform throughout with the exception of the end which forms the stern where the body of this triangular shaped boat is terminated by a cross section cut obliquely from the keel to the deck and in a direct plane so as to bring the sides gradually sloped off to an edge at the deck presenting the appearance of a wedge said deck forming the straight side thereof. The bow is to be formed in like manner except that the deck will slope down a little just at that part. and the sides somewhat inward which sloping will bring the sharp edge nearer the centre of the boat and thereby steady its motion through the water by presenting a front well adapted to divide and glide through it. From each of these I raise pillars or supporters to the platform of the vessel which is to be sustained above the water for the reception of freight so that the twin boats will be entirely submerged and being hollow will possess the requisite buoyancy to support it while all that agitation of the water will be avoided which would take place were they to run upon the surface of it. Beneath the platform o 1. 9386X Feb 12, 1836 the receiving vessel I place one or more semi cylinders. the flat section being attached thereto and their length to be nearly equal to that of the boat: having each end terminating in an oblique section so as to afford but little resistance to the water. The intention of these semi cylinders is to preserve the equilibrium of the platform or receiving vessel when in motion and when the hollow triangular Boats are sufficiently sunk. these last are placed at such a distance apart as to admit between them either a spiral screw or a paddle wheel for the purpose of driving or propelling the boat. or for more than one as the case make be. What I claim as my invention and not previously known and for which I now ask Letters Patent is not the idea of a submerged boat as that has been used before. but simply the form and construction I propose above as being better suited to the purpose intended of preventing the agitation of the surface in as great a degree as has been the case heretofore.

Secondly I also claim the use of the semi cylinders as set forth so adapted as to preserve the boat or receiving vessel in equilibrium when in motion.

In testimony that the above is a full description of my improvement as invented by me I have hereunto set my hand this twenty second day of December in the year Eighteen Hundred thirty five.

Witnesses
Geo. Hastings
A. D. Childs

Edw P. FitzPatrick (700)